United States Patent
Paduroiu

(10) Patent No.: US 12,455,881 B2
(45) Date of Patent: Oct. 28, 2025

(54) SECURE QUERY PROCESSING

(71) Applicant: Amazon Technologies, Inc., Seattle, WA (US)

(72) Inventor: Andrei Paduroiu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 17/953,038

(22) Filed: Sep. 26, 2022

(65) Prior Publication Data

US 2024/0104095 A1     Mar. 28, 2024

(51) Int. Cl.
*G06F 16/2453* (2019.01)
*G06F 16/2455* (2019.01)
*G06F 21/62* (2013.01)

(52) U.S. Cl.
CPC .... *G06F 16/24542* (2019.01); *G06F 16/2455* (2019.01); *G06F 21/6227* (2013.01)

(58) Field of Classification Search
None
See application file for complete search history.

(56) References Cited

U.S. PATENT DOCUMENTS

| | | | |
|---|---|---|---|
| 7,984,043 B1 | 7/2011 | Waas | |
| 10,289,723 B1 * | 5/2019 | Cai | G06F 16/2453 |
| 11,216,454 B1 * | 1/2022 | Cole | G06F 8/30 |
| 11,379,480 B1 * | 7/2022 | Breß | G06F 16/24537 |
| 11,620,118 B2 | 4/2023 | Schneuwly et al. | |
| 11,886,582 B1 | 1/2024 | Abdallah | |
| 2008/0071785 A1 * | 3/2008 | Kabra | G06F 16/24547 |
| | | | 707/999.009 |
| 2009/0112792 A1 * | 4/2009 | Barsness | G06F 16/2462 |
| 2012/0078951 A1 * | 3/2012 | Hsu | G06F 16/24532 |
| | | | 707/769 |
| 2012/0191642 A1 * | 7/2012 | George | G06F 16/24534 |
| | | | 707/718 |
| 2012/0191690 A1 * | 7/2012 | George | G06F 16/24547 |
| | | | 707/E17.108 |
| 2012/0317447 A1 * | 12/2012 | Yildiz | G06F 11/0784 |
| | | | 714/48 |
| 2013/0191650 A1 | 7/2013 | Balakrishnan et al. | |
| 2015/0379076 A1 * | 12/2015 | Grosse | G06F 16/2448 |
| | | | 707/718 |
| 2017/0193054 A1 * | 7/2017 | Tang | G06F 16/24575 |
| 2018/0096166 A1 | 4/2018 | Rogers et al. | |
| 2019/0207974 A1 | 7/2019 | Jas et al. | |

(Continued)

OTHER PUBLICATIONS

International Search Report and Written Opinion mailed Dec. 22, 2023, Patent Application No. PCT/US2023/075042, 15 pages.

(Continued)

*Primary Examiner* — Christopher J Raab
(74) *Attorney, Agent, or Firm* — Davis Wright Tremaine LLP

(57) ABSTRACT

A distributed database identifies classifications of risk associated with stages of a query plan. The distributed database generates an execution plan in which incompatible risk classifications are assigned to separate stages of an execution plan that is derived from the query plan. The stages are assigned to computing nodes for execution based, at least in part, on the risk classifications. A result for the query is generated based on execution of the stages on the assigned computing nodes.

20 Claims, 8 Drawing Sheets

(56) References Cited

U.S. PATENT DOCUMENTS

| | | | |
|---|---|---|---|
| 2020/0019722 A1 | 1/2020 | Li et al. | |
| 2020/0349163 A1* | 11/2020 | Nadeau | G06F 16/137 |
| 2020/0404007 A1 | 12/2020 | Singh et al. | |
| 2021/0374235 A1 | 12/2021 | Brossard et al. | |
| 2022/0138195 A1* | 5/2022 | Cole | G06F 16/2448 |
| | | | 707/713 |
| 2022/0179626 A1 | 6/2022 | Kacherginsky | |
| 2022/0374541 A1* | 11/2022 | Shigematsu | G06F 21/6227 |
| 2023/0004669 A1 | 1/2023 | Langseth et al. | |
| 2023/0112250 A1 | 4/2023 | Agrawal et al. | |

OTHER PUBLICATIONS

Wikipedia, "User-defined Function," Retrieved on Apr. 9, 2015 from http://en.wikipedia.org/w/index.php?title=User-defined function &oldid=401094103, 4 pages.

Anonymous, "SQL Abstract Syntax Trees Vocabulary," retrieved on Feb. 17, 2023 from http://ns.inria.fr/ast/sql/index.html, Jan. 28, 2014, 26 pages.

USPTO Non-Final Office Action dated Sep. 10, 2024, U.S. Appl. No. 18/082,559, 9 pages.

Yamaguchi et al., "Generalized Vulnerability Extrapolation Using Abstract Syntax Trees," ACM ACSAC, 2012, 11 pages.

Zhuo et al., "Long Short-Term Memory on Abstract Syntax Tree for SQL Injection Detection," The Institute of Engineering and Technology, Dec. 2020, 10 pages.

USPTO Non-Final Office Action dated Nov. 8, 2023, U.S. Appl. No. 17/988,724, 13 pages.

USPTO Notice of Allowance dated Jun. 11, 2025, U.S. Appl. No. 18/082,559, 8 pages.

\* cited by examiner

SECURE QUERY PROCESSING

BACKGROUND

Distributed database are increasingly being used for a variety of applications, including those for which performance, flexibility, and security are all important factors. Distributed databases are also increasingly being employed in multiuser environments. In these and other environments, security is often difficult to achieve without sacrificing performance and flexibility.

BRIEF DESCRIPTION OF THE DRAWINGS

Various techniques will be described with reference to the drawings, in which.

DETAILED DESCRIPTION

In an example, a distributed database system processes a query in a secure manner by separating query operations into stages based on a classification of risk associated with the respective stages. For example, a query might include both user-defined function and access to a secured table whose security might be jeopardized by execution of the user-defined function. In the example, the distributed database processes the query by generating an execution plan in which stages that executes the user-defined function is separated from stages that accesses the secured table. The stages of the execution plan are then performed by separate executors. The executors are selected for performing a given stage such that any executor that is currently being used to execute a user function, or which has been previously used to execute a user function, is not used to access a secured table. Similarly, an executor currently being used to access a secured table is not used to execute a user-defined function. This approach prevents the user function from being used, for example, as a trojan horse that might subsequently obtain access to data, from the secured table, to which the user function is not entitled to access.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
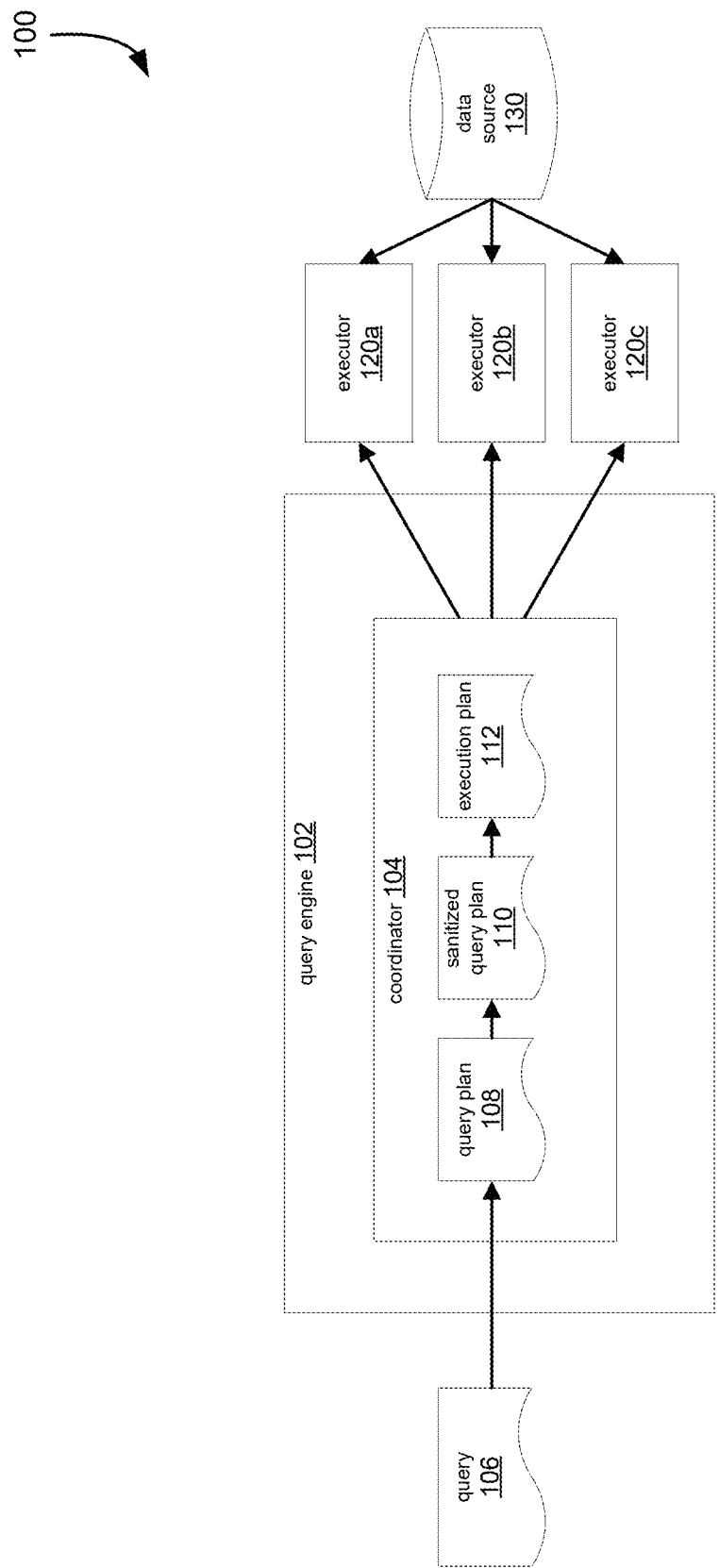
FIG. 1 illustrates an example of a distributed database system, in accordance with at least one embodiment.

FIG. 1 illustrates an example of a distributed database system, in accordance with at least one embodiment. In this example embodiment, a distributed database 100 comprises a query engine 102 that processes a query 106 using executors 120a-c.

A query, such as the depicted query 106, may include or correspond to instructions for inserting, updating, deleting, or reading data stored in the distributed database. In at least one embodiment, the query 106 is embodied as textual data, which may include but is not limited to structured query language ("SQL") statements or other programming languages. The query 106 may, in some embodiments, be expressed as natural language. The query 106 may also be embodied in code, for example as a sequence of application programming interface ("API") calls.

A distributed database, such as the depicted distributed database 100, may include any of a variety of computing systems that store and retrieve data using a plurality of computing nodes to store partitioned data. A computing node can include any of a variety of computing devices that comprise at least one processor, a memory device for storing instructions to be processed by the at least one processor, and storage on which a portion of the partitioned data is stored. A query of a distributed database is processed by performing insert, update, delete, and/or read operations on two or more of the plurality of computing nodes that make up the distributed database.

An executor, such as any of the depicted executors 120a-c, may include one of the computing nodes that make up the distributed database 100. Executors assist in the processing of a query by each performing one or more stages of an execution plan. The stages can comprise operations such as accessing a table, joining data from different tables, sorting data, executing user-defined functions, and so on.

The distributed database 100 may include a query engine 102. A query engine, such as the depicted query engine 102, may include software and/or hardware to perform functions described and attributed to it herein. The coordinator 104 interacts with the query engine 102 by means of an API to obtain query 106, and to generate from that query a query plan 108.

A query plan, such as the depicted query plan 108, may include a set of instructions that indicate what operations are to be performed in order to process a query. A query plan may have a tree-like structure consisting of various nodes, where each node represents one or more of these operations. The operations can include, but are not limited to, operations such as reading data from a table, writing data to a table, executing a user-defined function, joining data, and sorting data.

The coordinator 104 sanitizes query plan 108 to form a sanitized query plan 110. A sanitized query plan, such as the depicted sanitized query plan 110, may include properties that indicate classifications of risk associated with certain nodes and the operations those nodes represent. For example, nodes associated with user-defined functions might be marked with a property UserCode=true, and nodes associated with access to secured data might be marked with a property Secured=true. The sanitized query plan may also be modified, with respect to a query plan on which the sanitized query plan was based, to ensure that operations with incompatible risk classifications are separable, such that those operations can be performed in different stages of an execution plan.

The coordinator 104 transforms the sanitized query plan 110 into an execution plan 112. An execution plan, such as the depicted execution plan 112, is a set of executable stages that can be performed by executors, such as by the depicted executors 120*a-c*. The stages of an execution plan may correspond to nodes of the query plan on which it was based. The stages may be performed, by the executors, in an order dictated by the execution plan, although some stages might be performed in varied or nondeterministic order, or in parallel.

The stages of the execution plan 112 may access one or more data sources, such as the depicted data source 130. A data source, such as the depicted data source 130, can include any computing device or service that maintains tables or partitions of a table. In some cases, the executors themselves may store such data, such as when the executors maintain horizontal or vertical partitions of a table. In other cases, the executors access data stored on another computing node or service, as is depicted in FIG. 1.

The distributed database 100 may include capabilities for executing user-defined functions. User-defined functions, which might also be referred to as user functions, user code, and so on, can include processor-executable code, intermediate code, interpretable code, and so forth. Examples of user-defined functions include routines that accept one or more parameters, and return one or more values as output. User-defined functions provide significant and useful flexibility, but may be associated with a degree of risk, particularly in multiuser environments. For example, a user-defined function might contain "trojan horse" code that is intended to obtain access to which the user is not entitled.

The distributed database 100 may also include support for secured access to certain types of tables or other data sources, such as tables or other data sources which include data owned by multiple users, where each user may have a different set of permissions. For example, a given user might be permitted to access the data owned by that user, but not permitted to access data owned by any other user.

In order to operate at high speed, embodiments of the distributed database 100 might execute a user-define function within an executor, and implement access control within the query engine 102. However, this approach presents a security problem. User-submitted code, when executed, may potentially have the ability to inspect and/or alter the contents or behavior of the application it's running in or the system it's running on, including one or more of a process, virtual machine, or computing device. This may be the case whether or not such usage is intended. Furthermore, the user-defined function may leave behind running code that can compromise the system even after the user-defined function executes.

A distributed database system may, in some embodiments, execute a query according to the following steps. First, the user may submit the query 106 by providing SQL text or invoking one or more application programming interfaces ("APIs"). The query 106 is then transformed into a query plan. The query plan may take the form of a tree data structure, where the leaf nodes of the tree may typically represent operations that read data from a data source. The ancestors of these nodes may describe various operations that might be performed on this data, such as sorting, filtering, joining, and so forth. The resulting query plan may then be transformed into an executable plan, made up of a set of stages. The stages may have dependencies, such as one stage requiring input that is to be provided by the execution of another stage.

The coordinator 104 then orchestrates execution of these stages by sending them to the executors 120*a-c*. The executors may then execute the respective stages.

However, embodiments taking this approach might encounter certain problems. For example, a single stage might have code that both reads data from a secured source and applies security filters to it, and that executes a user-defined function. This may present a security risk, since the user-defined function might execute code that could interfere with the operation of the security filters, or otherwise obtain data that the user-defined function is not entitled to access.

To address these issues, embodiments may generate an execution plan that prevents user-defined functions from being performed on executors that will access secured data. Secured data may include data that is subjected to a security policy, such as a security policy that restricts a user's access to certain rows of a table. This may include multi-user tables in which a given user is only permitted to access data owned by that user. A security policy can include any of a variety of restrictions on access to data, including restrictions on reading, writing, updating, or deleting data. A security policy can be embodied in a variety of techniques or algorithms for implementing these restrictions.

In at least one embodiment, a coordinator 104 includes a sanitization component which takes as input a query plan $Q_1$ and transforms it into a sanitized query plan $Q_2$. This plan $Q_2$ is then used to generate an execution plan.

To generate $Q_2$, the sanitization component of coordinator 104 searches $Q_1$ for every node $N_i$ that has a user-defined function associated with it, and marks $N_i$ as UserCode=true. Other nodes are set to UserCode=false. The nodes of a query plan, such as a node $N_i$, may include properties, such as a UserCode property, to indicate a risk classification associated with that node.

The sanitization component also searches $Q_1$ for every node $N_s$ that accesses a secured data source $T_s$. This step may comprise looking up a data catalog associated with $T_s$ to determine if the data is secured, and/or determining whether a portion of plan $Q_1$ applies a security filter to data obtained from $T_s$. If a node accesses a secured data source, it is marked as Secured=true. Other nodes may be marked as Secured=false.

In at least one embodiment, rather than simply marking $N_s$ as Secure=true, the sanitization component replaces node $N_s$ with a node Filter($N_s$) that accesses data from $T_s$ and applies the relevant security filter. The node Filter($N_s$) is marked as Secured=true. The node Filter(Ns) may be a subtree that includes a leaf node to access data from $T_s$ and an ancestor node to apply a security filter.

In at least one embodiment, a planner component of the coordinator 104 then uses the resulting sanitized query plan Q2 to generate an execution plan 112 in which the user code execution and secured data access are separated into different execution stages. This may be done by the planner during generation of the execution plan 112, or as a post-processing step in which an initial version of an execution plan is sanitized by moving user code execution and secured data access into different stages.

In at least one embodiment, a technique for generating this execution plan comprises identifying stages in the execution plan that contain nodes with Secured=true, and marking those stages as Secured=true. Similarly, if there is a stage that contains a node with UserCode=true, that stage is marked with UserCode=true. Then, any stage that has both Secured=true and UserCode=true is split into two or more stages, so that no resulting single stage has both UserCode=true and Secured=true. In some cases, these stages may be merged with other stages, provided that the resulting execution plan has no stages with both properties set to true.

In at least one embodiment, the stages of the execution plan are assigned to executors 120*a-c* in the following way. Each executor is initially marked with a label, such as Sandboxed=false, that indicates that it has never executed a stage containing user code. An executor is also marked with a label, such as Sandboxed=true, once it has been used to execute a stage containing user code.

When the coordinator 104 schedules a stage for execution, it can assign a UserCode=true stage to any executor, provided that the executor is not running a Secure=true stage. For example, the coordinator 104 will not select an executor to run a UserCode=true stage if that executor is currently running another stage that is Secured=true. However, that executor could be selected once the Secured=true stage completes.

When an executor is used to perform a UserCode=true stage, the executor is marked as Sandboxed=true, and the coordinator 104 will no longer assign a stage with Secured=true to it. The executor, when assigning a Secured=true stage to an executor, will not assign that stage to an executed with Sandboxed=true. The executor, in at least one embodiment, will keep Sandboxed=true indefinitely (e.g., until a hardware reset), so that no Secured=true stage is ever performed on an executor that was used to execute user code.

Figure 2:
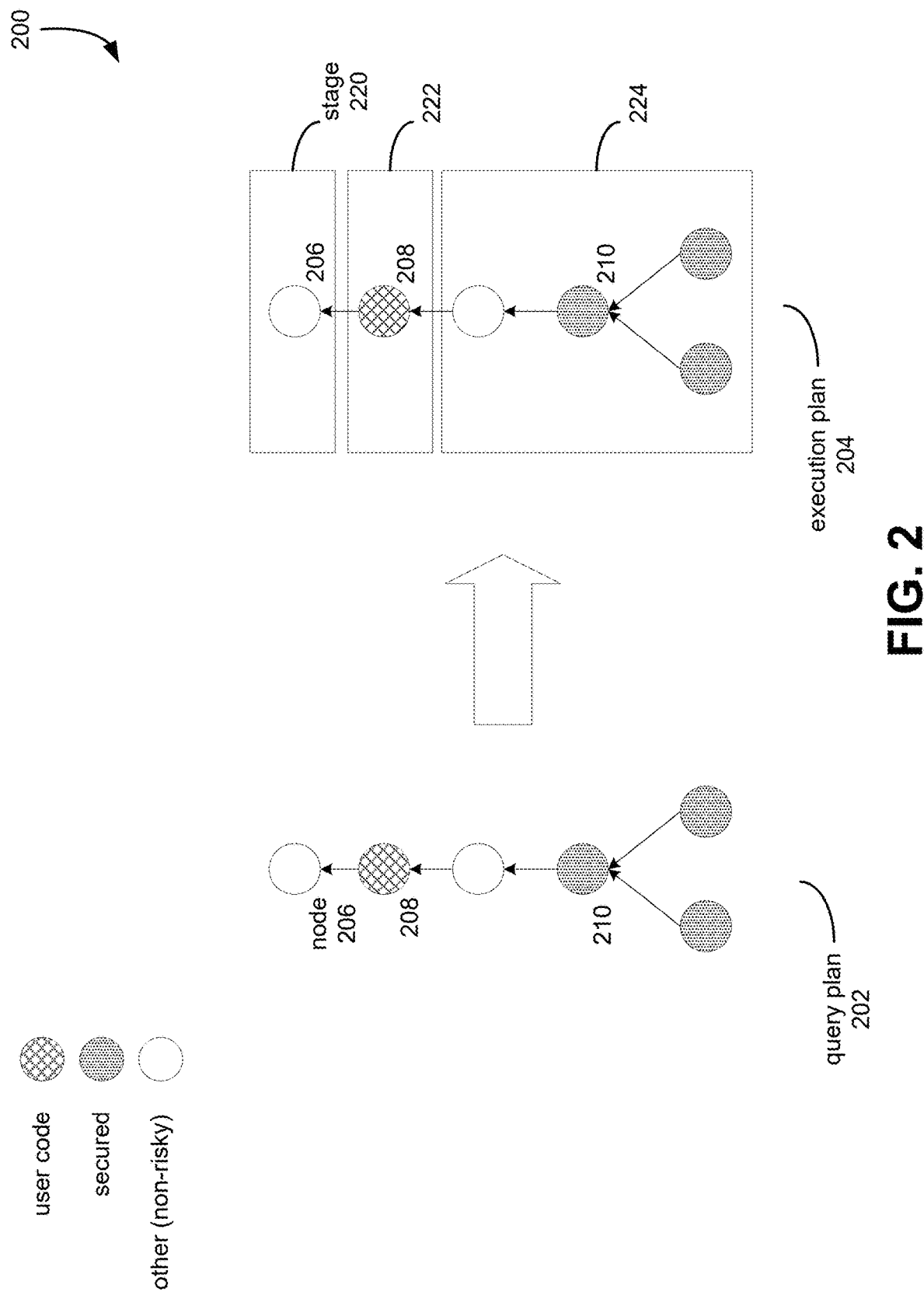
FIG. 2 illustrates an example of a distributed database system assigning portions of a query plan to stages of an execution plan, in accordance with at least one embodiment.

FIG. 2 illustrates an example of a distributed database system assigning portions of a query plan to stages of an execution plan, in accordance with at least one embodiment. In the depicted example 200, a query plan 202 is a tree structure comprising nodes 206-210. The nodes 206-210 of the query plan 202 represent operations to be performed in order to process a query. The branches between the nodes may represent dependencies between the nodes or a suggested order of execution. As depicted in the example 200, the nodes of the query plan 202 may be assigned risk classifications. Some nodes, such as the depicted node 208, may include instructions to execute a user-defined function or other user code, and be assigned to a user code risk classification. Other nodes, such as the depicted node 210, may include instructions to access secured data, and be assigned a secured data risk classification. Still other nodes, such as the depicted node 208, may not be associated with an operation considered to be risky, and may be assigned a neutral risk classification. A risk classification can be indicated, once assigned, by a property stored with the corresponding node of the query plan 202.

A distributed database, such as the one depicted in FIG. 1, may transform the query plan 202 into an execution plan 204. The distributed database may generate the execution plan 204 using the risk classifications assigned to the nodes in the query plan 202. Consistent with the algorithm described in relation to FIG. 1, the distributed database generates the execution plan 204 so that any stage that includes user code does not include secured data access, and that any stage that includes secured data access does not include user code. For example, as depicted in FIG. 2, the stage 222 of the query execution plan 204 generated by the distributed database includes execution of operations that correspond to node 208, which includes user code. This stage 222 does not, however, include execution of any operations that involve secured data access, such as the operations represented by node 210 of the query plan 202. Nodes that are not associated with either risk classification, such as node 206, may be assigned to any stage, such as stage 220. The distributed database, when generating the execution plan 204, will consider dependencies between the nodes. For example, the stage 224 may be executed first because it includes the nodes of the query plan that obtain data that is supplied for further processing to its ancestor nodes.

Figure 3:
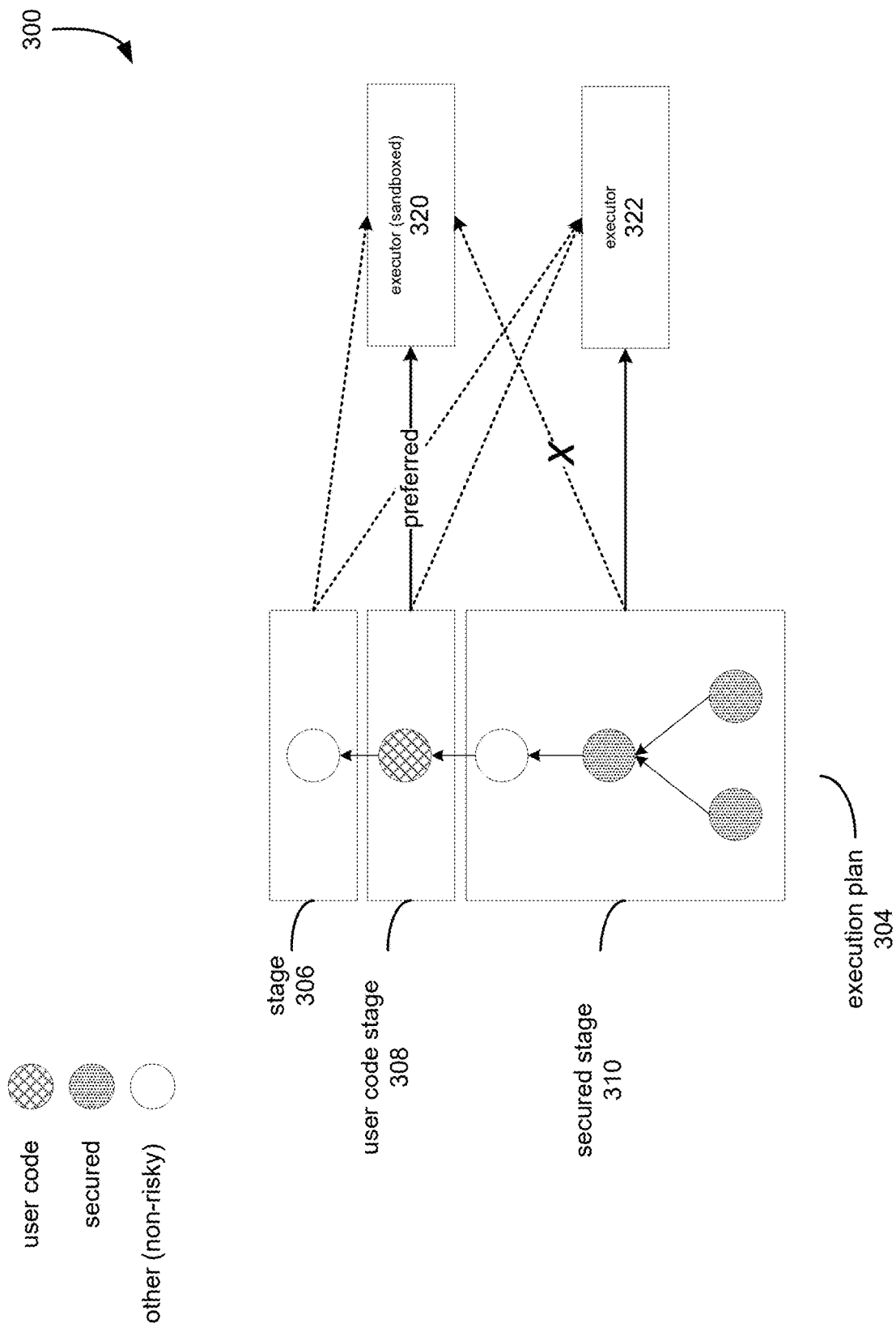
FIG. 3 illustrates an example of a distributed database system assigning stages of an execution plan to computing nodes for execution, in accordance with at least one embodiment.

FIG. 3 illustrates an example of a distributed database system assigning stages of an execution plan to computing nodes for execution, in accordance with at least one embodiment. In the example 300, an execution plan 304, which could correspond to the execution plan depicted in FIG. 2, comprises three stages 306-310. To perform this set of instructions, the stages are each assigned to an executor, such as one of the depicted executors 320-322. This assignment may be performed by a distributed database, including via a coordinator component of the distributed database similar to the one discussed in relation to FIG. 1. Among the depicted executors 320-322, the secured stage 310 may be assigned by the distributed database only to executor 322, which is not sandboxed, meaning that it has never been used to execute a stage that includes user code. The user code stage 308 may be assigned to either executor 320-322, but the distributed database may implement a preference for assigning it to an executor that has already been sandboxed, such as the depicted executor 320. The final stage 306, which contains neither user code nor secured data access, may be assigned by the distributed database to either executor 320-322.

Figure 4:
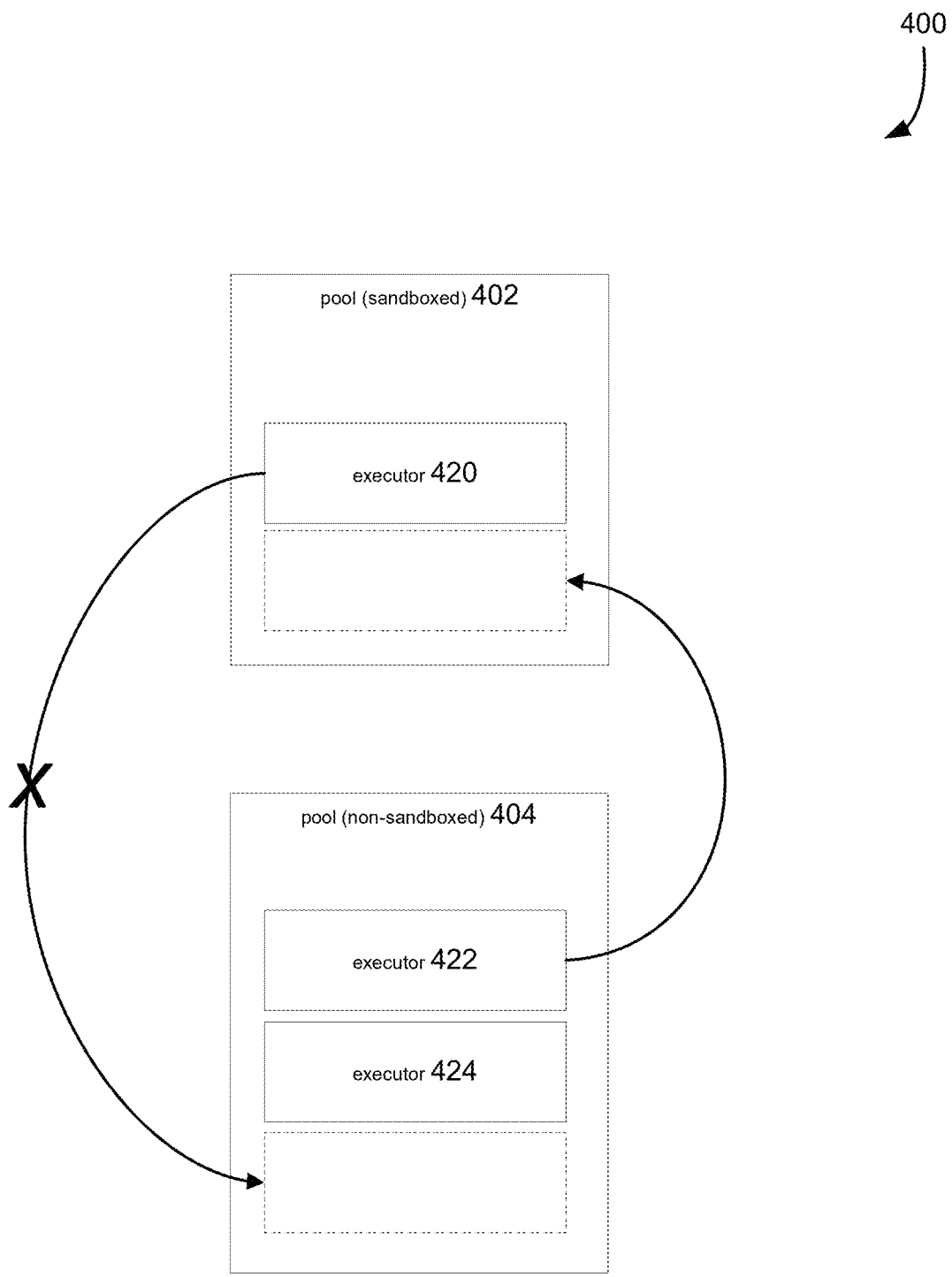
FIG. 4 illustrates an example of maintaining pools of computing node executors, in accordance with at least one embodiment.

FIG. 4 illustrates an example of maintaining pools of computing node executors, in accordance with at least one embodiment. As described in relation to the preceding figures, the distributed database may prevent executors used to perform user code stages from being used to perform secured data access stages. In at least one embodiment, this process is facilitated using a pooling mechanism, such as the one depicted in the example 400 of FIG. 4. In the example 400, executors 420-424 are assigned to pools 402-404. These may include a pool 402 of sandboxed executors, and a pool 404 of non-sandboxed executors. Here, sandboxed refers to executors that either have been used for executing stages with user code, or are intended to be used exclusively for executing stages with user code. Non-sandboxed refers to nodes that have not yet been used for executing user code.

As depicted in FIG. 4, an executor 422 in the non-sandboxed pool 404 may be transferred to the sandboxed pool 402. This may be done, for example, when there are an insufficient number of executors available for executing user code. However, once added to the sandboxed pool 402, an executor is not transferred back to the non-sandboxed pool 404. For example, once executor 420 has been placed in the sandboxed pool 402, it will not be transferred back to the non-sandboxed pool 404. If additional executors are needed in the pool 404, they can be added by drawing from some other source, such as from an additional pool of newly configured executors.

Figure 5:
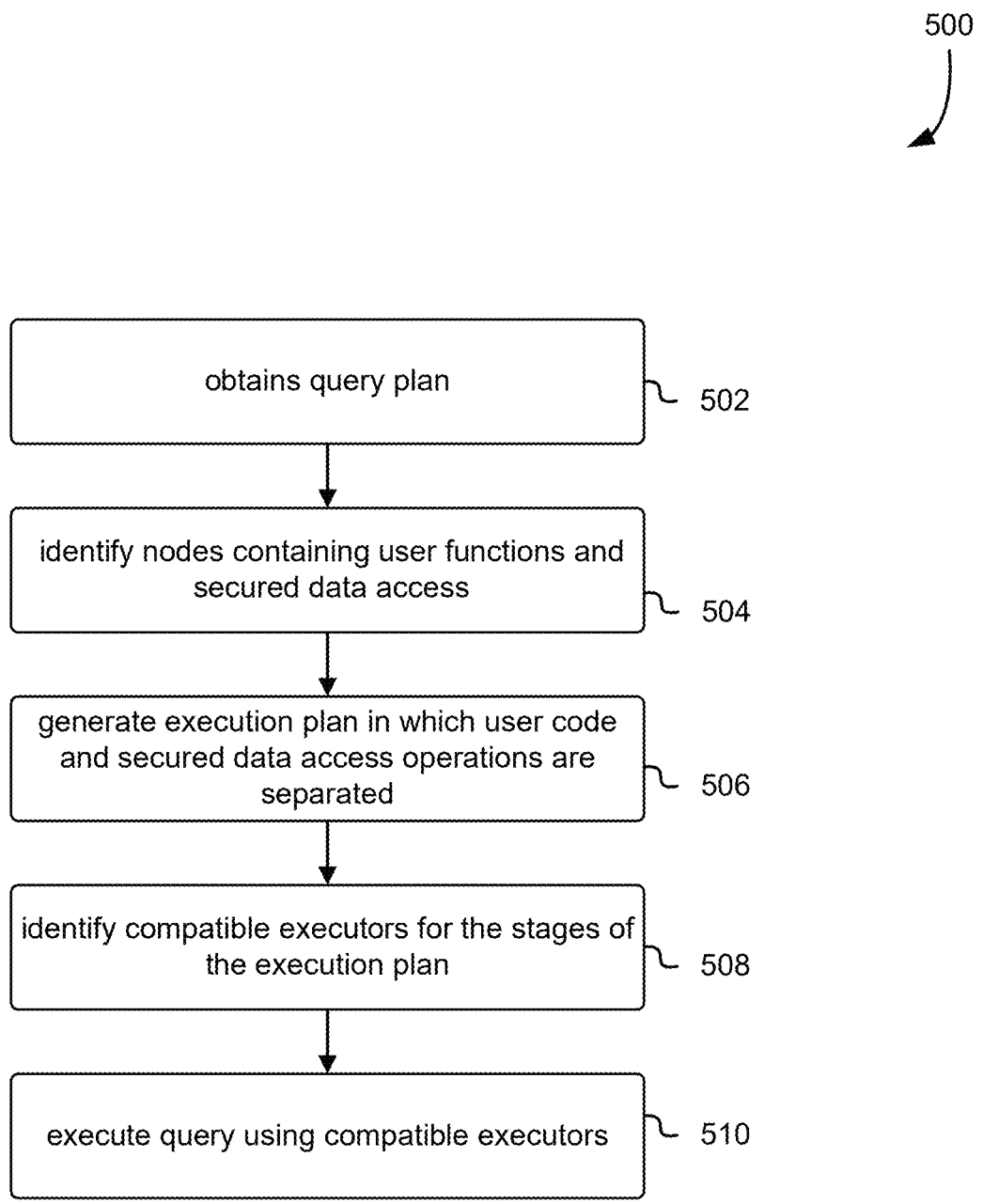
FIG. 5 illustrates an example process of a distributed database system processing a database query, in accordance with at least one embodiment.

FIG. 5 illustrates an example process of a distributed database system processing a database query, in accordance with at least one embodiment. Although the example process 500 of FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 502, the distributed database obtains a query plan. The query plan may be obtained by parsing a received query, analyzing the parsed query, and generating, based on this analysis, a set of instructions for processing the query. The query plan may, in some embodiments, be generated by a query engine, such as the query engine depicted in FIG. 1.

At 504, the distributed database identifies nodes of the query plan that contain user functions and secured data access. This may be done, for example, as described in relation to the preceding figures. In at least one embodiment, a query plan is analyzed and nodes of the query plan may be marked with properties to indicate a node's respective risk classifications. In some embodiments, identification or marking of the nodes comprises storing information indicating the risk classification associated with a node. Risk classifications can include user code and secured data access, or other classifications such as operations that may be associated with denial of service or other attack types.

At 506, the distributed database generates an execution plan in which user code operations are separated from secured data access operations. This may be done, for example, as described in relation to the preceding figures. In at least one embodiment, the execution plan is generated so that incompatible risk classifications are assigned to separate stages, and the stages are marked according to those risk classifications. Stages may be marked, for example, using properties such as Secured=true or UserCode=true, to indicate the risk classification associated with a given stage of execution.

At 508, the distributed database identifies compatible executors for the stages of the execution plan. This may be done, for example, as described in relation to the preceding figures. Each stage of the execution plan may comprise one or more operations from the query plan, and is marked, if appropriate, with risk classifications associated with those operations. The distributed database generates the execution plan so that, for a given stage, the included operations do not contain incompatible risk classifications, such as user code and secure data access. In order to identify compatible executors, the distributed database may, for example, match stages that require sandboxing (such as UserCode=true stages) with executors that have, in their history, been previously sandboxed. Conversely, the distributed database may match stages whose risk classifications are incompatible with sandboxing (such as Secured=true stages) with executors that have not been sandboxed. Note that this does not necessarily preclude the user of hardware that has been previously used to run code with an incompatible risk classification, but at least some embodiments of the system will ensure that such hardware has been hard-reset, soft-reset, or otherwise made safe prior to such reuse.

At 510, the distributed database executes the query using the compatible executors. In at least one embodiment, this comprises the distributed database causing each stage of the execution plan to be performed on the compatible executor to which the stage is assigned. This may be done, for example, as described in relation to the preceding figures.

Figure 6:
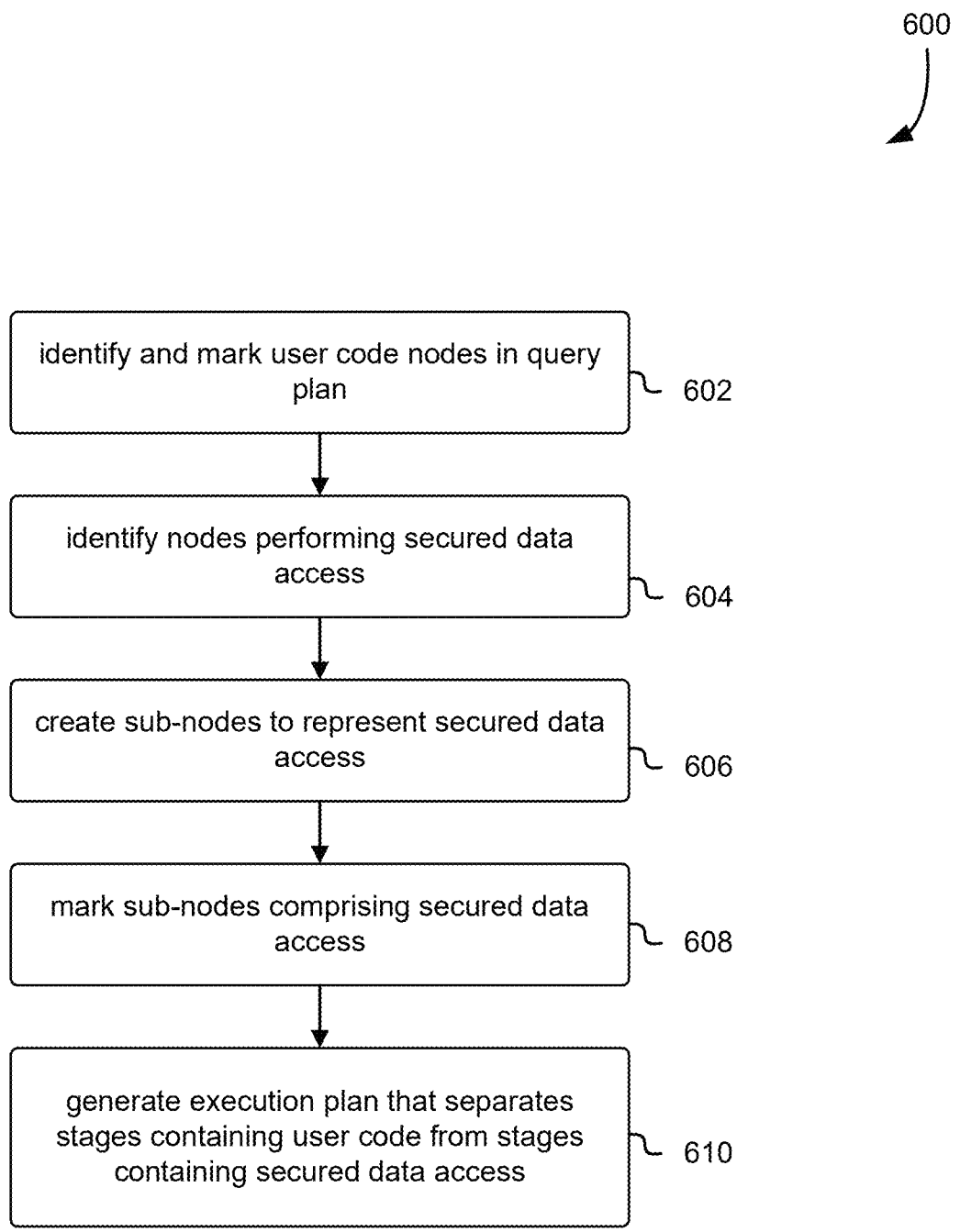
FIG. 6 illustrates an example process of a distributed database system generating a secured execution plan, in accordance with at least one embodiment.

FIG. 6 illustrates an example process of a distributed database system generating a secured execution plan, in accordance with at least one embodiment. Although the example process 600 of FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 602, the distributed database identifies and marks user code nodes in query plan. In at least one embodiment, this may comprise a search of one or more data structures corresponding to the query plan. The data structures may include a tree data structure comprising nodes linked by edges. The nodes may represent operations to be performed to process the queries, and the edges may represent dependencies between the respective operations. The search of the data structures may comprise traversal of the nodes via the edges, and examination of properties associated with the nodes. With respect to block 602, the distributed database may locate nodes that have properties indicative of a user code operation, and add an additional property to indicate that the node should be treated as associated with the user code risk classification.

At 604, the distributed database identifies nodes performing secured data access. Similar to block 602, this may comprise a search of the query plan. Operations that access data may be inspected to determine if they are accessing secured data. This may be done, in some embodiments, by identifying the data being accessed, examining a data catalog or schema, and using the information from the data catalog or schema to determine if the data is secured.

At 606, the distributed database creates sub-nodes to represent operations to access secured data. This may be done, for example, to separate secured data access from non-secured data access. As depicted at 608, the distributed database marks sub-nodes that comprise secured data access with a corresponding property, e.g., Secured=true.

At 610, the distributed database generates an execution plan that separates stages containing user code from stages containing secured data access. This may be done, for example, as described in relation to the preceding figures.

As one skilled in the art will appreciate in light of this disclosure, certain embodiments may be capable of achieving certain advantages, including improving security of the distributed database while still allowing for user code and access to secured data, including access to data in multiuser tables.

Figure 7:
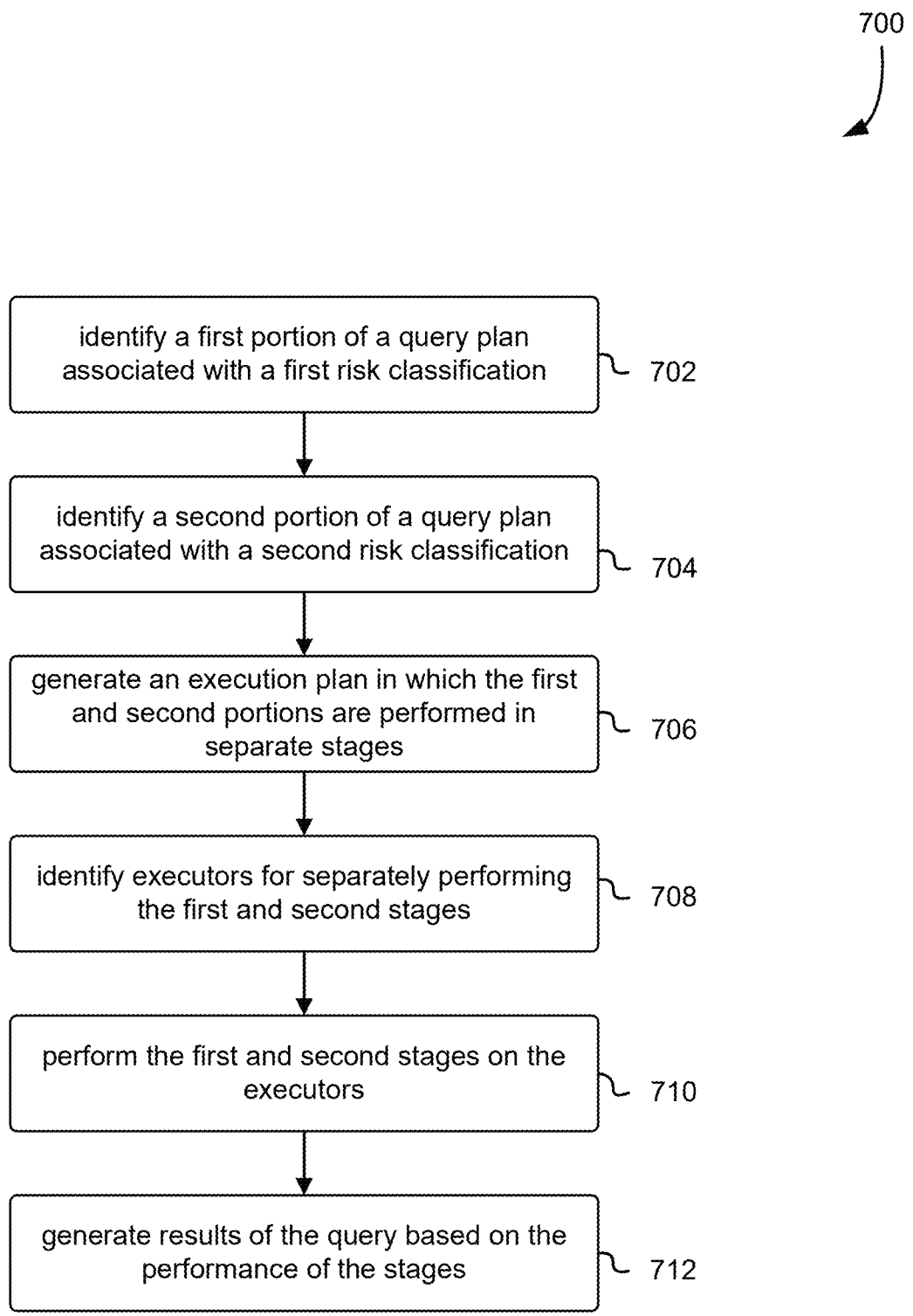
FIG. 7 illustrates an example process of a distributed database executing a query using separation of operations associated with incompatible risk classifications, in accordance with at least one embodiment.

FIG. 7 illustrates an example process 700 of a distributed database executing a query using separation of operations associated with incompatible risk classifications, in accordance with at least one embodiment. Although the example process 600 of FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 702, the distributed database identifies a first portion of a query plan associated with a first risk classification.

At 704, the distributed database identifies a second portion of a query plan associated with a second risk classification.

At 706, the distributed database generates an execution plan in which the first and second portions are performed in separate stages.

At 708, the distributed database identifies executors for separately performing the first and second stages.

At 710, the distributed database performs the first and second stages on the executors.

At 712, the distributed database generates results of the query based on the performance of the stages.

In an example embodiment of the process described in relation to FIG. 7, a system comprises at least one processor and at least one memory to store computer-executable instructions that, in response to execution by the at least one processor, cause the system to perform the operations depicted in relation to FIG. 7. The system identifies instructions in a query plan that are indicative of executing a user-defined function, and identifies instructions that are indicative of accessing a database table associated with a security policy. The system then generates, based at least in part on the identification of these instructions, an execution plan in which the instructions related to the user-defined function are to be performed in a first stage separate from a second stage of the execution plan in which the instructions indicative of accessing the database table are to be performed. The database table is associated with a security policy that controls access to at least a portion of the database table. The system then causes the first stage of the execution plan to be executed on a first computing node, and causes the second stage of the execution plan to be executed on a second computing node that is distinct from the first computing node. The system then provides a result of the query based on the execution of these stages.

In the example, the execution of the instructions may further cause the system to reserve the first computing node for executing stages that comprise user-defined functions. This may be done in response to its use for executing a stage comprising a user-defined function. The stage may be reserved exclusively for stages comprising user-defined functions, or alternatively may be reserved for stages comprising user-defined functions as well as stages whose security risks are compatible with execution on an executor that is executing, or has executed, a user-defined function.

In the example, the execution of the instructions may further cause the system to select the second computing node to execute the second stage of the execution plan based, at least in part, on a determination that the second computing node has not been used to execute a user-defined function.

In the example, the database table may store data on behalf of a plurality of users. Furthermore, the security policy may limit access by any one user to a subset of the table associated with that one user. Implementation of this policy may be incompatible with execution, on the same executor, of a user-defined function, and moreover may be incompatible with execution on an executor that has previously performed a user-defined function.

In another example of the process described in relation to FIG. 7, a computer-implemented method of processing a database query comprises identifying a first portion of a query plan associated with a first classification of risk, and identifying a second portion of a query plan associated with a second classification of risk. These risk classification are those deemed to be incompatible for running simultaneously on an executor, and moreover may be deemed incompatible with running on an executor that has been used previously for at least one of the risk classifications. The example method further comprises generating an execution plan in which the portions of the query plan are to be performed in separate stages of an execution plan. The method further comprises performing the execution plan using at least first and second computing nodes to execute the respective stages, and generating results for the query based on the execution of the stages.

In a further aspect of the example method, the first classification of risk is associated with a user-defined function and the second classification of risk is associated with multiple users sharing a table of a database.

In a further aspect of the example method, a classification of risk is identified based, at least in part, on examination of a database catalog.

In a further aspect of the example method, the example method further comprises reserving at computing node for executing stages that comprise user-defined functions. The computing node may be reserved exclusive for stages including execution of user-defined functions, or may be reserved for stages including execution of user-defined functions and other operations whose risk profile is compatible with user-defined function execution.

In a further aspect of the example method, the example method further comprises determining that a computing node has not been used to execute a user-defined function, and selecting that computing node to execute a stage comprising a risk profile incompatible with user-defined functions based, at least in part, on this determination. For example, a stage including access to a secured table may be assigned to an executor computing node that has not previously been used to execute a user-defined function.

In a further aspect of the example method, the example method further comprises generating a version of the query plan in which portions of the query plan are marked according to their respective association with a classification of risk.

In a further aspect of the example method, the execution plan is generated based, at least in part, on assigning operations to stages according to a classification of risk associated with an assigned operation. This may be done, for example, based on properties marking the risk classification associated with the nodes of a query plan.

Figure 8:
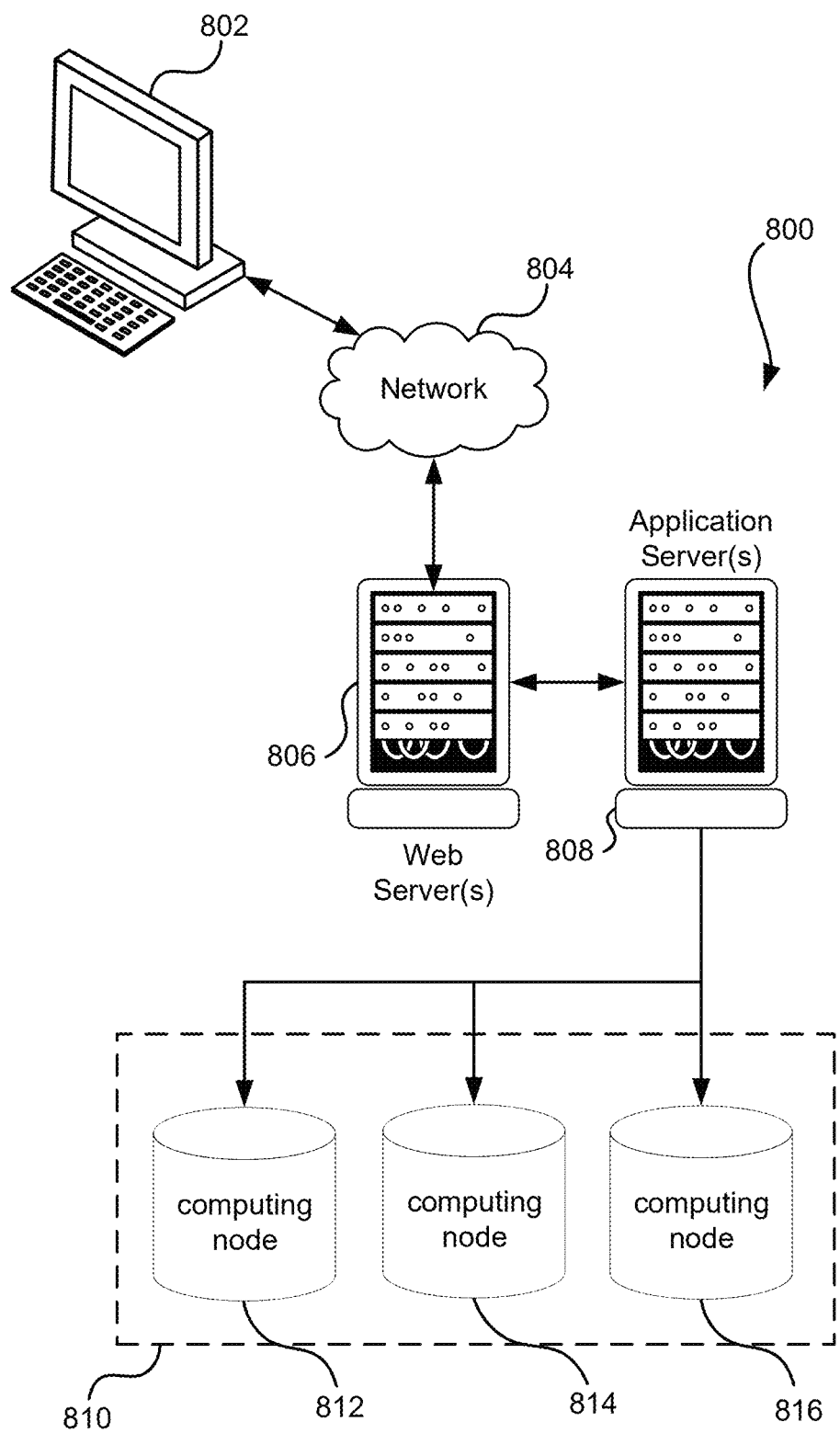
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a distributed database 810, and it should be understood that there can be several application servers, layers or other elements, processes or components, which may be chained or otherwise configured, which can interact to perform tasks such as obtaining data from an appropriate data store. The distributed database 810, in at least one embodiment, corresponds to a distributed database described herein in relation to the preceding figures. The distributed database 810 can comprise a plurality of computing nodes 812, 814, and 816. The computing nodes 812, 814, and 816 may, for example, correspond to executors and a query engine as described in relation to FIG. 1, and others of the preceding figures.

Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The distributed database 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the distributed database 810.

The distributed database 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
    at least one processor; and
    at least one memory that stores computer-executable instructions that, in response to execution by the at least one processor, cause the system to:
        identify a first portion of a query plan, the first portion indicative of executing a user-defined function;
        identify a second portion of the query plan, the second portion indicative of accessing a database table associated with a security policy, wherein each of the first and the second portions of the query plan are to be executed by different computing nodes;
        generate, based at least in part on:
            the identification of the first and second portions, and
            a security rule that prohibits the same computing node from executing user-defined functions and accessing the database table where security of the database table could be jeopardized by execution of user-defined functions at the same computing node,
        an execution plan in which the first portion is to be performed in a first stage separate from a second stage of the execution plan in which the second portion is to be performed;
        cause the first stage of the execution plan to be performed on a first computing node;
        cause the second stage of the execution plan to be performed on a second computing node; and
        provide a result of the query based, at least in part, on the performance of the first and second stages.

2. The system of claim 1, wherein the at least one memory comprising further computer-executable instructions that, in response to execution by the at least one processor, cause the system to:
    reserve the first computing node for executing other stages comprising user-defined functions, or operations compatible with user-defined functions, in other execution plans, in response to using the first computing node to perform the first stage comprising the user-defined functions.

3. The system of claim 1, wherein the at least one memory comprising further computer-executable instructions that, in response to execution by the at least one processor, cause the system to:
    select the second computing node to perform the second stage of the execution plan based, at least in part, on a determination that the second computing node has not been used to execute a user-defined function.

4. The system of claim 1, wherein the database table stores data on behalf of a plurality of users and the security policy limits access by any one user to a subset of the table associated with that one user.

5. A computer-implemented method of processing a query of a database, comprising:
    identifying a first portion of a query plan associated with a first classification of risk;
    identifying a second portion of a query plan associated with a second classification of risk, wherein each of the first and the second portions of the query plan are to be executed by separate computing nodes in accordance with a security rule that prohibits the same computing node from executing at least one type of function and accessing at least one type of data where security of the at least one type of data could be jeopardized by execution of the at least one type of function at the same computing node;
    generating an execution plan in which the first portion is to be performed in a first stage separate from a second stage of the execution plan in which the second portion is to be performed;
    performing the execution plan using at least a first computing node to execute the first stage and a second computing node to execute the second stage; and
    generating results of the query based, at least in part, on execution of the first and second stages.

6. The computer-implemented method of claim 5, wherein the first classification of risk is associated with a user-defined function and the second classification of risk is associated with multiple users sharing a table of a database.

7. The computer-implemented method of claim 5, wherein a stage of the execution plan comprises one or more operations corresponding to one or more portions of the query plan.

8. The computer-implemented method of claim 5, wherein a classification of risk is identified based, at least in part, on examination of at least one of a database catalog or a schema.

9. The computer-implemented method of claim 5, wherein the first computing node is reserved for executing stages that comprise the first classification of risk and executing stages compatible with the first classification of risk.

10. The computer-implemented method of claim 5, further comprising:
    determining that the second computing node has not been, and is not being, used to execute a stage associated with the first classification of risk; and
    selecting the second computing node to execute the second stage based, at least in part, on the determining.

11. The computer-implemented method of claim 5, further comprising:
    generating a version of the query plan in which portions of the query plan are marked according to their respective association with a classification of risk.

12. The computer-implemented method of claim 5, wherein the execution plan is generated based, at least in part, on assigning operations to stages according to a classification of risk associated with an assigned operation.

13. A non-transitory computer-readable storage medium storing thereon executable instructions that, as a result of being executed by one or more processors of a computer system, cause the computer system to at least:
    identify a first portion of a query plan associated with a first classification of risk;

identify a second portion of a query plan associated with a second classification of risk, wherein each of the first and the second portions of the query plan are to be executed by different computing nodes;

generate an execution plan in which the first portion is to be performed in a first stage separate from a second stage of the execution plan in which the second portion is to be performed; and cause the execution plan to be performed using at least a first computing node to execute the first stage and a second computing node to execute the second stage in accordance with a rule that prohibits the same computing node from executing at least one type of function and accessing at least one type of data where security of the at least one type of data could be jeopardized by execution of the at least one type of function at the same computing node.

14. The non-transitory computer-readable storage medium of claim 13, comprising further instructions that, as a result of being executed by the one or more processors, cause the computer system to:

mark a portion of the query plan according to a classification of risk associated with the portion.

15. The non-transitory computer-readable storage medium of claim 13, comprising further instructions that, as a result of being executed by the one or more processors, cause the computer system to:

identify a portion of the query plan associated with the second classification of risk; and modify the identified portion so that the second classification of risk is associated with at least one of a child portion or sibling portion of the identified portion.

16. The non-transitory computer-readable storage medium of claim 13, wherein the second classification of risk is associated with access to a database table that stores data on behalf of a plurality of users and a security policy that limits access by any one user to a subset of the table associated with that one user.

17. The non-transitory computer-readable storage medium of claim 13, wherein the first computing node is reserved for executing stages that comprise user-defined functions and stages that are compatible with risk associated with executing user-defined functions.

18. The non-transitory computer-readable storage medium of claim 13, comprising further instructions that, as a result of being executed by the one or more processors, cause the computer system to:

determine that a computing node to be used to execute a stage associated with the second classification of risk has not been used to execute a stage associated with the first classification of risk.

19. The non-transitory computer-readable storage medium of claim 13, comprising further instructions that, as a result of being executed by the one or more processors, cause the computer system to:

select the first computing node to perform the first stage based, at least in part, on a determination that the first computing node is not currently executing a stage associated with the second classification of risk.

20. The non-transitory computer-readable storage medium of claim 13, comprising further instructions that, as a result of being executed by the one or more processors, cause the computer system to:

identify an additional portion of the query plan that is not associated with either of the first classification of risk or the second classification of risk; and assign the additional portions to a selected stage of the execution plan, the selection made irrespective of classifications of risk associated with other portions assigned to the selected stage.

* * * * *